(12) United States Patent
Song et al.

(10) Patent No.: US 11,385,346 B2
(45) Date of Patent: Jul. 12, 2022

(54) CONNECTED WEATHER RADAR

(71) Applicant: Honeywell International Inc., Morris Plains, NJ (US)

(72) Inventors: Jing Song, Beijing (CN); Lin Wang, Beijing (CN); Peng Liu, Beijing (CN); Wei Cui, Beijing (CN); Patrick Glaze, Duvall, WA (US)

(73) Assignee: Honeywell International Inc., Charlotte, NC (US)

( * ) Notice: Subject to any disclaimer, the term of this patent is extended or adjusted under 35 U.S.C. 154(b) by 240 days.

(21) Appl. No.: 16/786,892

(22) Filed: Feb. 10, 2020

(65) Prior Publication Data

US 2021/0247513 A1 Aug. 12, 2021

(51) Int. Cl.
*G01S 13/95* (2006.01)
*G01S 13/933* (2020.01)

(52) U.S. Cl.
CPC .......... *G01S 13/953* (2013.01); *G01S 13/933* (2020.01)

(58) Field of Classification Search
CPC ... G01S 13/933; G01S 13/953; G08G 5/0021; G08G 5/0039; G08G 5/0052; G08G 5/0078; G08G 5/0091; G08G 5/045
See application file for complete search history.

(56) References Cited

U.S. PATENT DOCUMENTS

| | | | |
|---|---|---|---|
| 7,417,579 B1 | 8/2008 | Woodell | |
| 7,979,199 B2 | 7/2011 | Judd et al. | |
| 8,395,534 B2 | 3/2013 | Christophe et al. | |
| 8,643,533 B1 | 2/2014 | Woodell et al. | |
| 9,297,895 B2 | 3/2016 | Kashi et al. | |
| 9,535,158 B1 | 1/2017 | Breiholz et al. | |
| 9,649,935 B2 | 5/2017 | Bas Gago et al. | |
| 9,864,055 B1 | 1/2018 | Sishtla et al. | |
| 10,147,330 B2 | 12/2018 | Schwartz et al. | |
| 10,302,761 B1 | 5/2019 | Woodell et al. | |
| 2007/0049260 A1* | 3/2007 | Yuhara | G01C 21/3694 455/414.3 |
| 2008/0167885 A1* | 7/2008 | Judd | G08G 5/0021 701/120 |
| 2009/0276149 A1 | 11/2009 | Kauffman et al. | |
| 2011/0270473 A1 | 11/2011 | Reynolds et al. | |
| 2015/0348421 A1* | 12/2015 | Kashi | G08G 5/0008 701/10 |
| 2016/0266249 A1* | 9/2016 | Kauffman | G01S 13/95 |
| 2017/0038457 A1* | 2/2017 | Wang | G01S 7/003 |
| 2017/0132942 A1 | 5/2017 | Mere | |
| 2018/0164431 A1* | 6/2018 | Kalyandurg | G01S 13/58 |
| 2018/0251230 A1 | 9/2018 | Chavez et al. | |

(Continued)

OTHER PUBLICATIONS

Federal Aviation Administration "ADS-B; In Trail Procedures (ITP)," retrieved from https://www.faa.gov/nextgen/programs/adsb/pilot/itp/ Aug. 20, 2019, 2 pp.

(Continued)

*Primary Examiner* — Timothy X Pham
(74) *Attorney, Agent, or Firm* — Shumaker & Sieffert, P.A.

(57) ABSTRACT

In one example, this disclosure is directed to a system configured to detect inclement weather in the travel path of a vehicle, determine a recommended maneuver to avoid the inclement weather, and determine the feasibility of the recommended maneuver with respect to any nearby vehicles.

14 Claims, 6 Drawing Sheets

(56) References Cited

U.S. PATENT DOCUMENTS

2021/0383708 A1* 12/2021 Gibbons, II ......... G08G 5/0013
2022/0028287 A1* 1/2022 Durant ............. G06Q 10/08355

OTHER PUBLICATIONS

Extended Search Report from counterpart European Application No. 21153613.1, dated Jul. 2, 2021, 7 pp.
Response to Search Report dated Jul. 2, 2021, from European Application No. 21153613.1, filed Oct. 13, 2021, 14 pp.

* cited by examiner

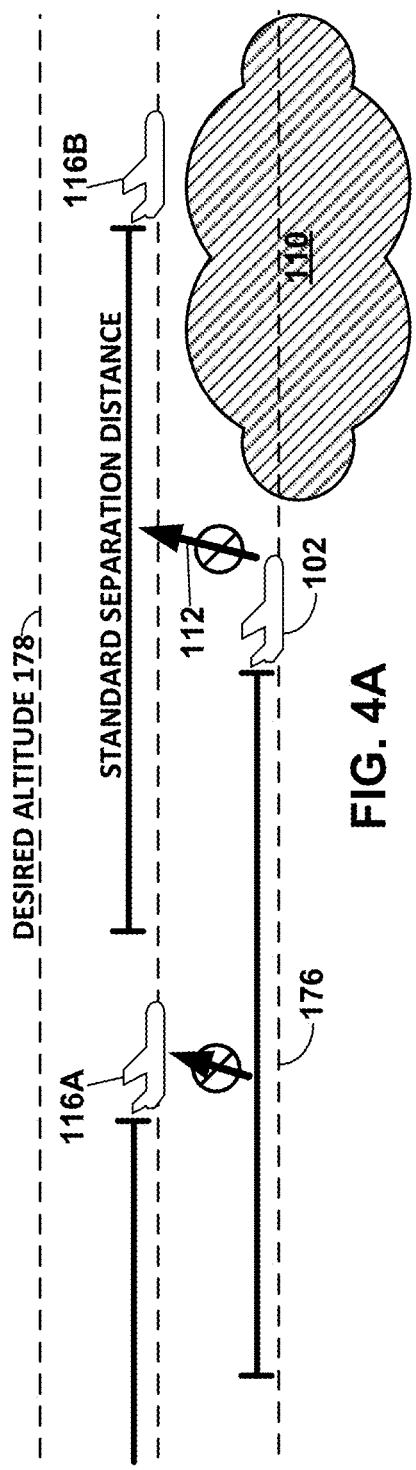
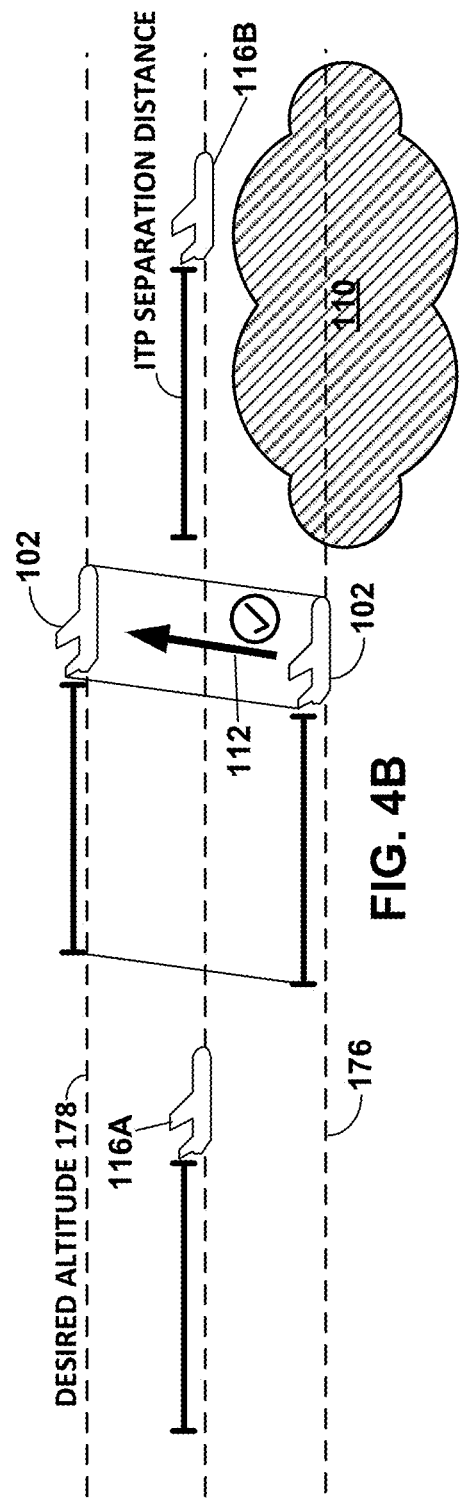
FIG. 4A
FIG. 4B

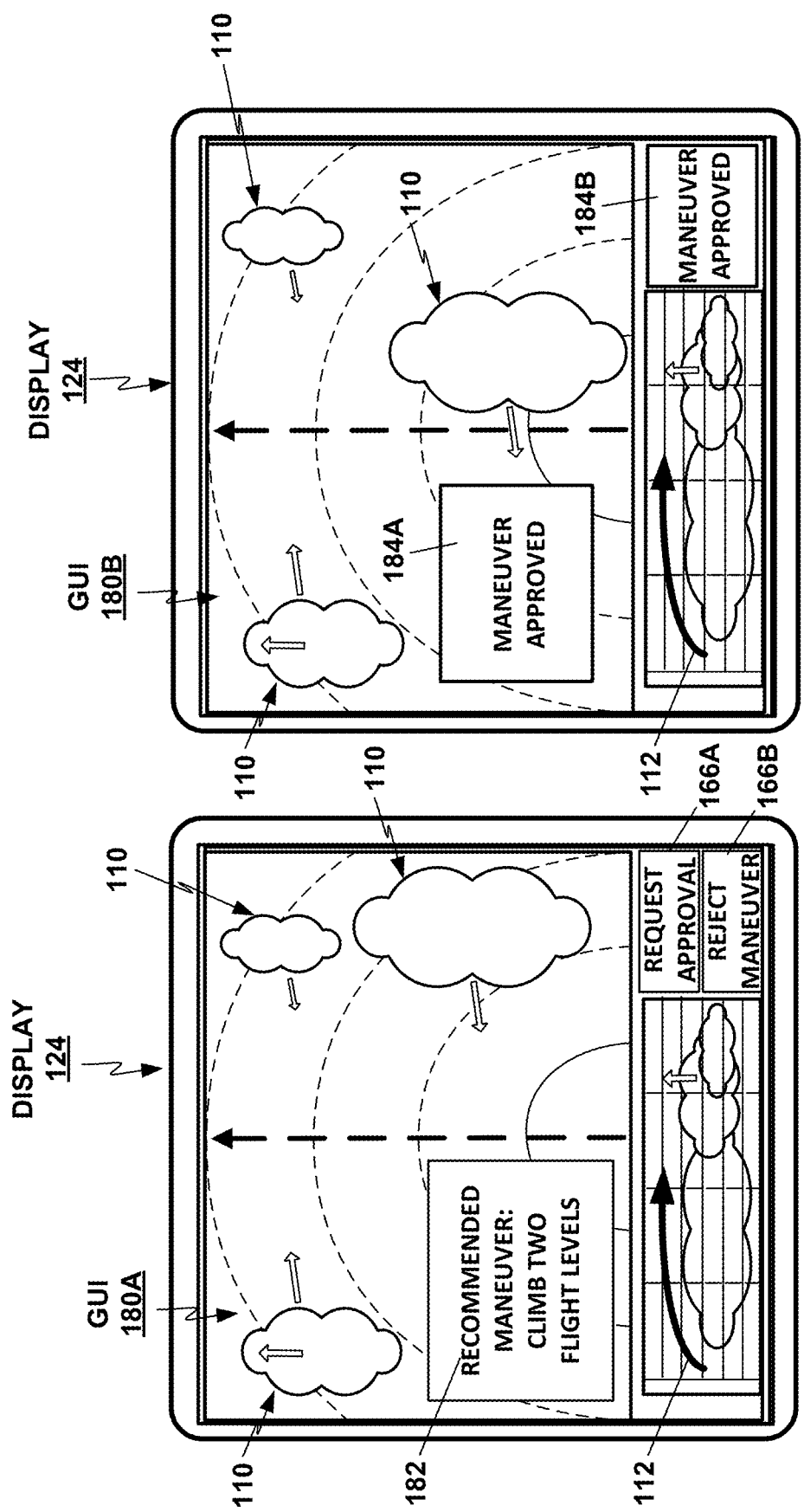

CONNECTED WEATHER RADAR

This disclosure relates to weather radar systems.

BACKGROUND

An aircraft may use an onboard weather radar system to detect adverse weather conditions, which may enable the flight crew to make changes to the flight plan as necessary to avoid potentially hazardous weather. The onboard weather radar system may be mounted on the aircraft and may use radar scans to detect reflected radar signals from weather formations such as convective weather cells associated with turbulence, rain, lightning, and hail. Up-to-date weather information may assist the flight crew of the aircraft in evaluating whether or how to modify a flight plan to ensure safety of the flight, as well as to promote fuel efficiency, time efficiency, and passenger comfort. The onboard weather radar system may control weather radar scanning and may process radar return signals to present a visual weather radar display. An aircraft in flight may also receive weather data from other sources such as ground-based weather radar stations, which may help identify convective weather regions or other emerging hazards for aircraft operations. Aircraft operators and flight crews may thus be enabled to evaluate hazardous areas as they are detected and to evaluate potential changes in heading or flight altitude in response.

Additionally, a vehicle may include a collision avoidance and/or situational awareness system for alerting an operator to a potential collision with another vehicle based on passive surveillance of signals transmitted from the other vehicle. The system may determine the position of the other vehicle, as well as characteristics such as the velocity and direction of travel. Based on these characteristics, the system may create a protection volume (e.g., a safety envelope) around the ownship vehicle and/or the other vehicle for the purpose of predicting the likelihood of a collision between the two vehicles.

SUMMARY

In general, this disclosure is directed to methods, techniques, devices, and systems for detecting an area of inclement weather by an aircraft onboard radar system and automatically determining a feasible maneuver around the storm front.

One example is directed to a system comprising one or more processors configured to identify, based on a radar signal, an area of inclement weather in a travel path of a vehicle; determine a recommended maneuver for the vehicle to avoid the area of inclement weather; and communicate, to a navigation system onboard the vehicle, an indication of the recommended maneuver for the vehicle.

Another example is directed to a method that includes transmitting, by a weather radar system onboard a vehicle, radar signals; receiving, by the weather radar system, reflections of the radar signals; determining, by the weather radar system based on the reflections, an area of inclement weather in a travel path of the vehicle; determining, by the weather radar system, a recommended maneuver for the vehicle to avoid the area of inclement weather; and communicating, by the processing circuitry to a navigation system onboard the vehicle, an indication of the recommended maneuver for the vehicle.

Another example is directed to a device that includes one or more processors and a computer-readable storage medium operatively coupled to the one or more processors and storing executable instructions. The executable instructions configure the one or more processors to identify, based on a radar signal, an area of inclement weather in a travel path of a vehicle; determine a recommended maneuver for the vehicle to avoid the area of inclement weather; and communicate, to a navigation system onboard the vehicle, an indication of the recommended maneuver for the vehicle.

The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A and 4B depict conceptual diagrams of an aircraft conducting an example recommended maneuver in order to avoid inclement weather, in accordance with techniques of this disclosure.

FIGS. 5A and 5B depict example user interfaces for a weather-avoidance system, in accordance with techniques of this disclosure.

DETAILED DESCRIPTION

Techniques of this disclosure may enable automatic maneuver determinations, evaluations, recommendations, and requests in order to avoid an area of inclement weather in a current travel path of a vehicle. For example, systems and devices may be configured to automatically detect a weather structure with characteristics indicative of inclement weather, determine a recommended maneuver around the area of inclement weather, evaluate whether the maneuver will interfere with the travel path of any other nearby vehicles, recommend the maneuver to an operator of the vehicle, and generate a maneuver request for a traffic control authority. Various examples of weather-avoidance maneuver techniques, systems, devices, and methods are further described below.

Figure 1:
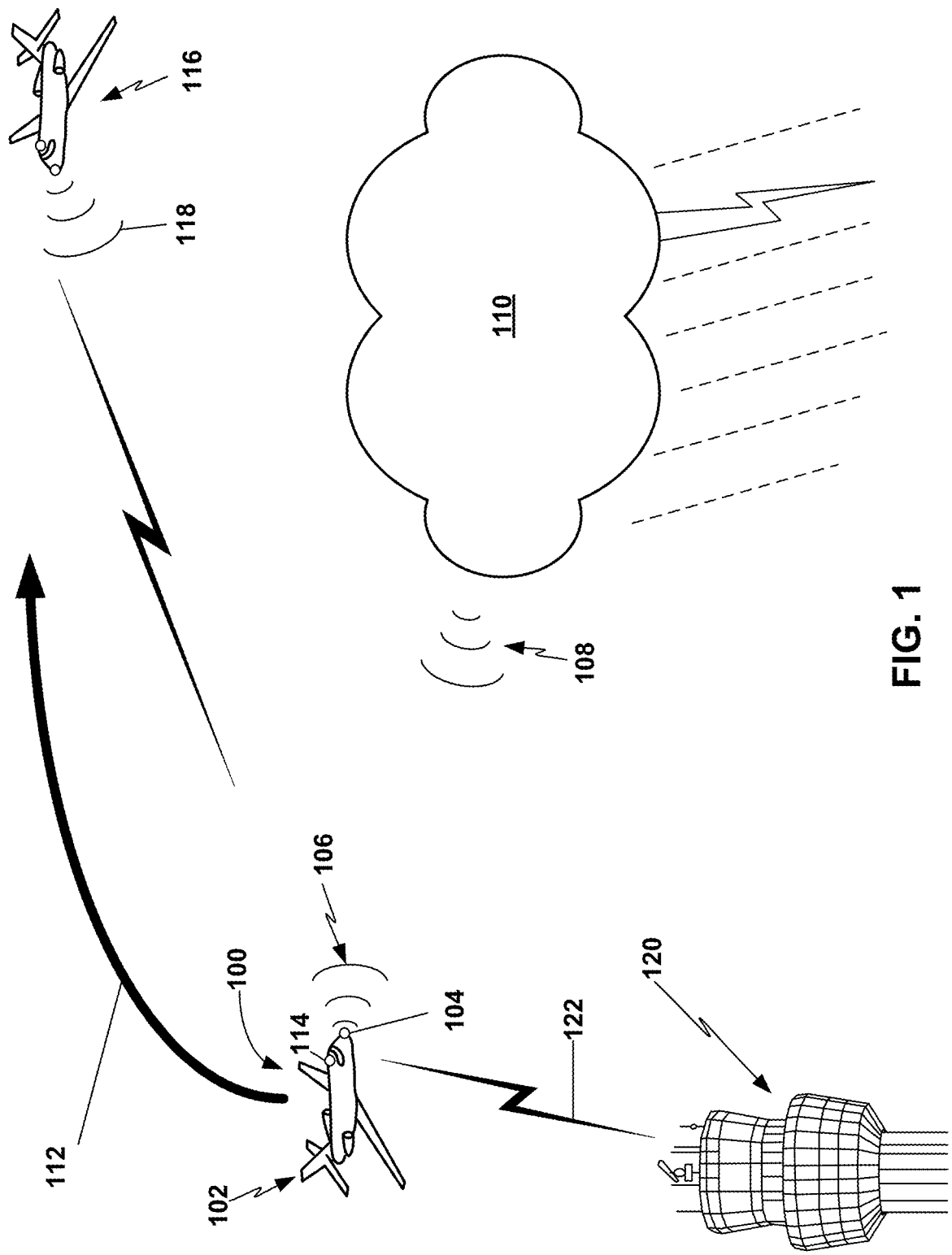
FIG. 1 depicts a conceptual diagram including a vehicle equipped with an example weather-avoidance system, in accordance with techniques of this disclosure.

FIG. 1 depicts a conceptual diagram of a vehicle 102 equipped with an example weather-avoidance system 100, in accordance with one example of the disclosure. In the example depicted in FIG. 1, vehicle 102 is depicted as aircraft 102, however, the techniques of this disclosure may similarly be applicable to any other air vehicle, such as a helicopter or unmanned aerial vehicle (UAV).

In this example, weather-avoidance system installed in aircraft 102 includes at least an onboard weather radar system 104 and a vehicle navigation system 114. Weather radar system 104 and vehicle navigation system 114 may be integrated into a single coherent unit, or alternatively, may be two physically distinct units in data communication with one another.

Onboard weather radar system 104 performs and processes weather radar scans. For example, weather radar system 104 may include at least a transmitter configured to emit a transmitted radar signal 106 and a receiver configured to detect a reflected radar signal 108. As described further with respect to FIG. 2 below, onboard weather radar system 104 may include processing circuitry configured to identify, based on reflected signal 108, one or more obstacles surrounding aircraft 102, and output an indication of the obstacle(s) for display to a user, such as a pilot of aircraft 102. For example, as shown in FIG. 1, weather radar system 104 may be configured to detect, based on reflected radar signal 108, an instance of inclement weather 110 within a current intended flightpath of aircraft 102. For example, inclement weather 110 may generally include any hazardous atmospheric disturbance, such as a storm cell, storm clouds, hail, rain, tornadoes, hurricanes, blizzards, strong headwinds, or turbulence.

In some examples in accordance with this disclosure, weather radar system 104 may be configured to determine, based on a reflected radar signal, an area of inclement weather in the travel path of the vehicle and determine a recommended maneuver for the vehicle to avoid the area of inclement weather. For example, weather radar system 104 may detect upcoming inclement weather 110 and determine (e.g., compute or select), based on one or more characteristics of the weather 110, a recommended flight maneuver 112 in order to avoid the inclement weather 110. For example, weather radar system 104 may be configured to determine a recommended flight maneuver 112 based on one or more factors relating to the inclement weather 110, such as, but not limited to, a speed and/or direction of motion, a current or future proximity to aircraft 102, a size and/or shape, a relative severity, and a general nature, such as whether the weather is or will be discharging precipitation, snow, hail, lightning, tornadoes, or other detritus toward the ground.

In some examples, radar system 104 may determine a recommended flight maneuver 112 including a change in flightpath in order to avoid inclement weather 110, for example, by changing a horizontal direction of travel in order to circumvent weather 110 while maintaining a constant altitude. In other examples, radar system 104 may determine a recommended flight maneuver 112 including a vertical change in altitude in order to either "jump over" or "crawl under" the inclement weather 110. As previously discussed, because inclement weather 110 may be releasing one or more of rain, snow, hail, lightning, or tornadoes downward toward the ground, weather radar system 104 may more often determine that an upward climb in altitude to "jump over" the storm 110 is preferable to a downward drop in altitude for the comfort and/or safety of the vehicle's occupants.

In some examples in accordance with this disclosure, weather radar system 104 may be configured to determine a recommended flight maneuver 112 and communicate the recommended flight maneuver 112 to an onboard vehicle navigation system 114 in order to evaluate the feasibility of the recommended maneuver. For example, aircraft 102 may include a collision-avoidance and/or situational-awareness navigation system 114 for alerting an operator to a potential collision with another nearby vehicle 116. In some examples, navigation system 114 may be configured to determine (e.g., predict) a potential collision with another vehicle 116 based, for example, at least in part on passive surveillance of signals 118 transmitted from the other vehicle 116. One non-limiting example of signals 118 transmitted by vehicle 116 may include automatic dependent surveillance-broadcast (ADS-B) signals, in which an aircraft determines its position or location by satellite navigation and broadcasts an indication of the position.

In-Trail Procedures (ITP) is a recent advanced application of ADS-B signals, allowing for more-accurate determinations of aircraft locations and relative positions to one-another. The more-accurate determinations allow for at least two applications that may be utilized in one or more examples of this disclosure. First, as described further below, aircraft equipped with ITP may implement a reduced mandatory separation distance from other nearby aircraft when changing altitude (e.g., ascending or descending). Second, aircraft equipped with ITP may be allowed to perform an altitude change consisting of two vertical flight levels at a time, rather than just one vertical flight level at a time.

In some examples in accordance with this disclosure, navigation/collision-avoidance system 114 may be configured to determine at least the position of the other vehicle 116, and based on the position, determine other related factors, such as the vehicle's velocity and direction of travel. Based on these characteristics, navigation system 114 may determine a protection volume (e.g., a safety envelope) around the ownship vehicle 102 and/or the other vehicle 116 for the purpose of predicting the likelihood of a collision between the two vehicles. As referenced above, the protection volume may consist of the regulated minimum vertical and horizontal separation distances that a pilot must observe between the ownship and any other aircraft in the vicinity.

In some examples in accordance with this disclosure, navigation/collision-avoidance system 114 may be configured to receive an indication of recommended flight maneuver 112 from weather radar system 104, and determine whether the recommended flight maneuver 112 is feasible with respect to separation distances from any nearby aircraft 116. For example, navigation system 114 may be configured to determine whether the recommended flight maneuver 112 would cause aircraft 102 to pass through the mandatory separation distance from another aircraft 116, or vice versa.

In the event that navigation system 114 determines that recommended flight maneuver 112 would not cause proximity concerns with any other aircraft 116, weather avoidance system 100 may be configured to present an indication of the recommended maneuver to a user for approval. For example, weather avoidance system 100 may be configured to output a prompt for a user, such as a pilot of vehicle 102, to approve or reject the recommended flight maneuver 112. For example, either or both of radar system 104 and navigation system 114 may include a display screen configured to output an indication of recommended flight maneuver 112 (such as a textual indication and/or graphical depiction), and an input device (e.g., touchscreen, button, microphone, or any other user input device) through which a user may indicate acceptance or approval of recommended flight maneuver 112.

In response to receiving user input indicative of an approval of the recommended flight maneuver 112, weather-avoidance system 100 may be configured to transmit an indication of the flight maneuver to a traffic controller. For example, system 100 may be configured to automatically generate an altitude-change permission request and transmit the permission request to a traffic controller, such as ground-based air-traffic controller 120, such as via datalink service 122. For example, datalink service 122 may include and/or make use of one or more ground-based datalink assets, one or more telecommunication satellites, and potentially additional assets. Upon receiving an indication of granted permission from traffic controller 120, weather-avoidance system 100 may be configured to output for display an indication of the maneuver approval. For example, system 100 may be configured to output an indication of the granted permission in order to inform the pilot, such that the pilot of aircraft 102 may perform the recommended flight maneuver 112.

Figure 2:
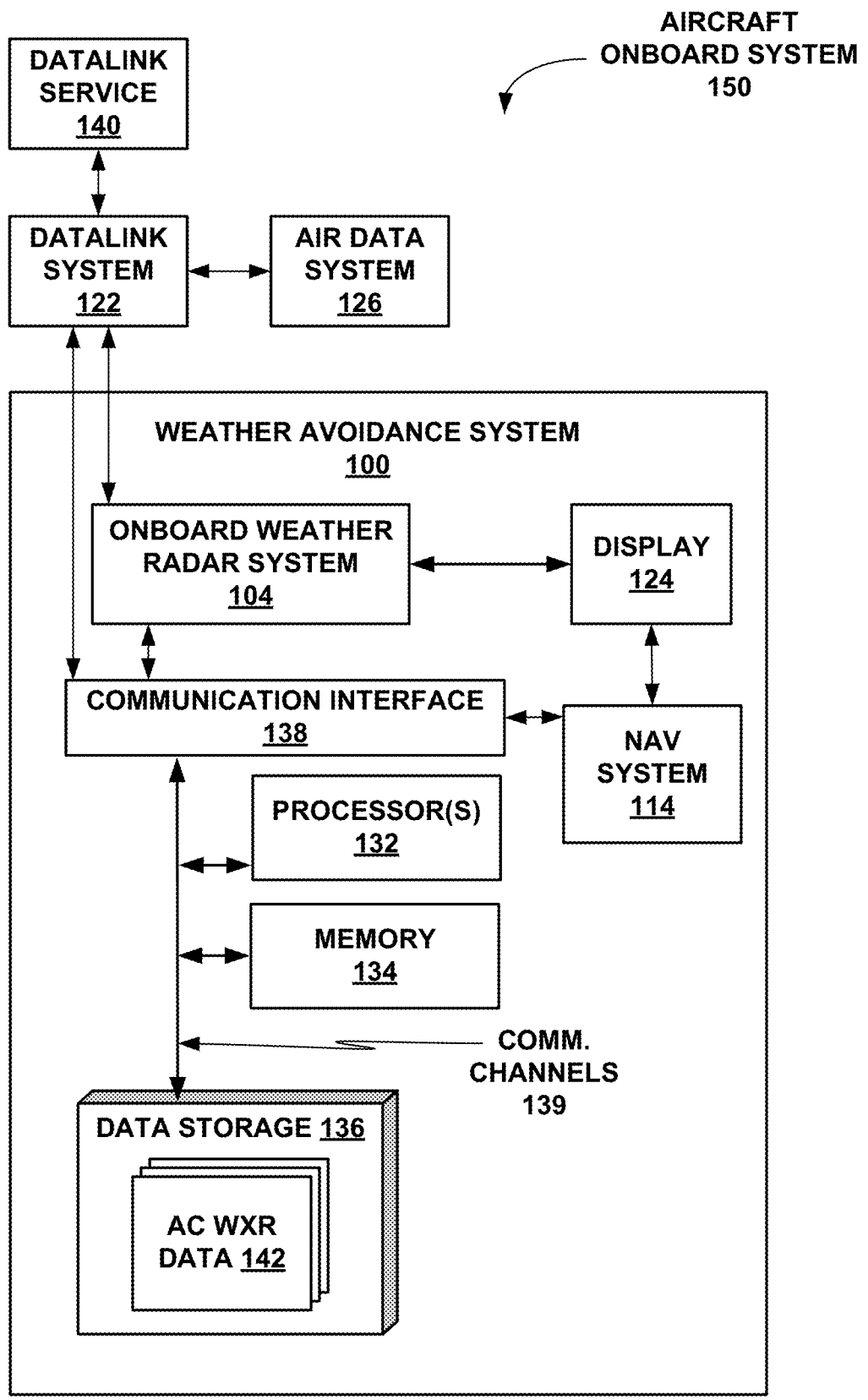
FIG. 2 depicts a block diagram of an onboard aircraft system including an example weather-avoidance system, in accordance with techniques of this disclosure.

FIG. 2 depicts a block diagram of an aircraft onboard system 150, including an example weather-avoidance system 100, in accordance with techniques of this disclosure. Weather-avoidance system 100 includes at least an onboard weather radar system 104 and a vehicle navigation system 114, such as a situational-awareness and/or collision-avoidance system. In some examples, weather radar system 104 and navigation system 114 are two distinct entities in data communication with one another. In other examples, weather radar system 104 and navigation system 114 may be integrated into a single coherent unit (e.g., share common processing circuitry 132 and/or memory 134).

In some examples, weather avoidance system 100 includes a display 124, which may include or be a weather radar display system configured to render display of weather radar data from onboard weather radar system 104. Display 124 may also be configured to display other weather data from other weather data sensors or sources. In other examples, display 124 is associated primarily with navigation system 114, in that it is configured to output an indication, such as an alert, of a potential collision with another aircraft. Portions or all of aircraft onboard system 150 may be implemented in an integrated avionics system.

While weather radar system 104 is depicted separately from navigation system 114 and display 124 in FIG. 2, display 124 may be part of or integrated with either or both of onboard weather radar system 104 and navigation system 114 in various implementations. For example, in some implementations in which aircraft onboard system 150 is in an integrated architecture, weather avoidance system 100 may be implemented as a modular avionics unit configured to collect data from all available components of onboard system 150. In some examples in which aircraft onboard system 150 is implemented in an integrated architecture or a federated architecture, weather avoidance system 100 may be implemented as part of or co-located with weather data display system 124, which may already be configured to collect, process, and integrate data from several or all available weather data systems and sensors onboard aircraft 102. In other examples in which aircraft onboard system 150 is implemented in a federated architecture, onboard weather radar system 104 is a three-dimensional (3D) weather radar system, and display 124 does not have access to the full 3D scanning buffer memory of onboard weather radar system 104, weather avoidance system 100 may be implemented as part of or co-located with onboard weather radar system 104, to facilitate weather avoidance system 100 being configured to have access to the full 3D scanning buffer memory of onboard weather radar system 104. Onboard weather radar system 104 is also operatively coupled to datalink system 122, which may include radio transmission and reception equipment (e.g., a Ka band radio interface) configured to maintain broadband datalink communications with a datalink service.

As shown in FIG. 2, weather avoidance system 100 includes one or more processors 132 ("processors 132") (e.g., CPUs), one or more memory components 134 ("memory 134") (which may host in-memory data stores), one or more data storage devices 136 ("data storage 106") (e.g., hard disc drives or flash drives, which may host databases or schema-less data stores), and a communication interface (CI) 138 (e.g., including a network or bus connection), which is connected to one or more of the other components depicted in FIG. 2 and via datalink system 122 to datalink service 140. Weather avoidance system 100 is thus configured to communicate via datalink service 140.

In weather avoidance system 100, the processors 132, memory 134, data storage 136, and communication interface 138 are interconnected by communication channels 139, such as a bus or communication fabric, for transporting or communicating data and instruction code between processors 132, memory 134, data storage 136, and communication interface 138. Processors 132 may include one or more central processing units (CPUs), one or more CPU cores, one or more graphical processing units (GPUs), or any other type of processing units. Memory 134 may include any form of working memory, such as any form of random access memory (RAM). Data storage 136 may include any form of hard disc drives, redundant array of independent discs (RAID), Flash drives, cloud storage, or any other form of data storage, and may host any form of databases, schema-less data stores, or any type of data stores. Weather avoidance system 100 may process incoming data and outgoing data via communication interface 138, which may include interface subsystems for managing data communication with other systems and components of aircraft onboard system 150 including onboard weather radar system 104 and onboard electronic weather data display system 124, and via datalink system 122 with datalink service 140.

Datalink service 140 may include one or more datalink stations and one or more telecommunications satellites. Telecommunications satellites are configured to maintain radio broadband datalink connections with aircraft 102, 116. Telecommunications satellites and datalink stations are configured to maintain a radio broadband datalink connection with each other. Datalink service 140 may also include ground-based datalink stations that communicate directly with aircraft 102, such as stations that implement Flight Information Services-Broadcast (FIS-B). Assets such as datalink stations and telecommunications satellites may thus implement datalink service 140 to maintain broadband datalink connections among aircraft 102, 116, and weather-avoidance system 100. Weather-avoidance system 100 may receive weather radar data from onboard weather radar system 104. Weather avoidance system 100 may at least temporarily store sets of aircraft weather radar data 142 from onboard weather radar system 104 within data storage 136.

Figure 3:
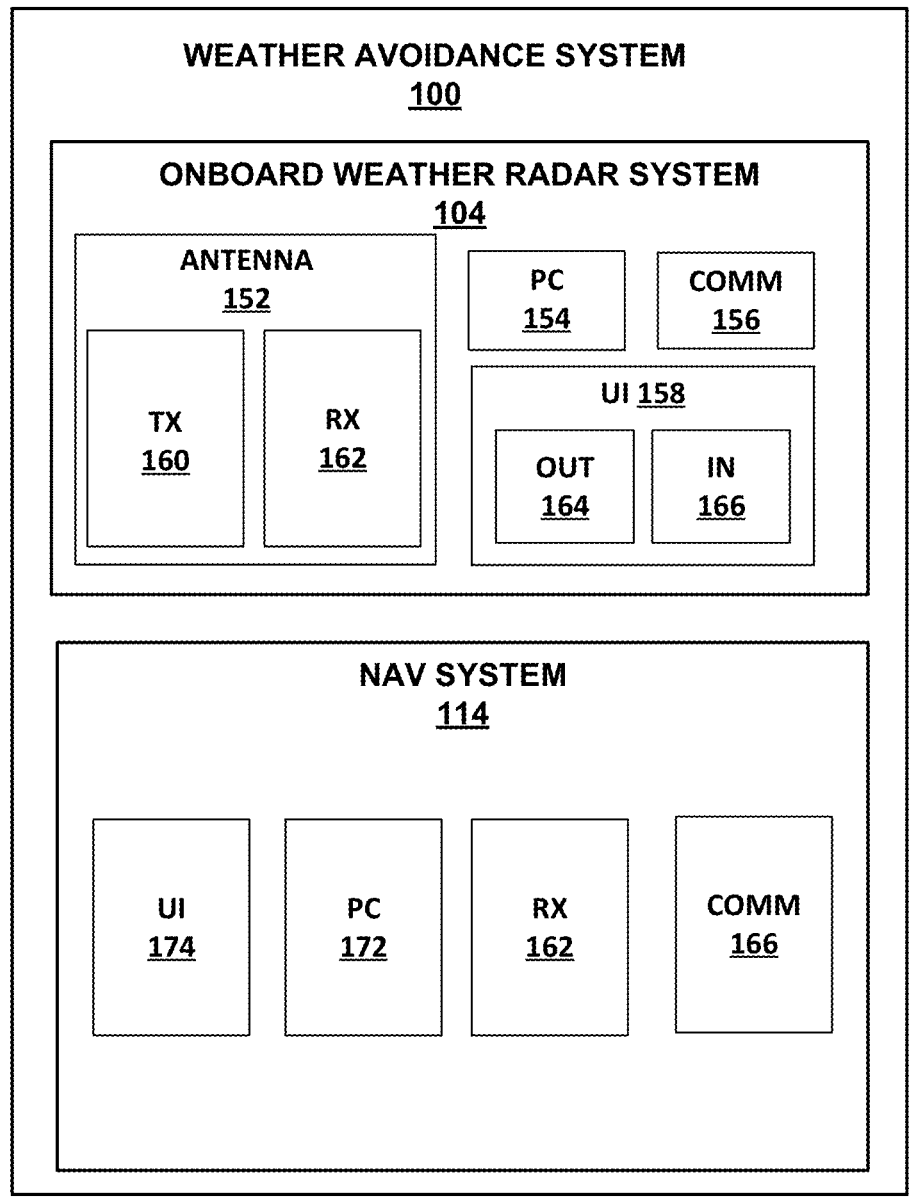
FIG. 3 depicts a block diagram of some example components of a weather-avoidance system, in accordance with techniques of this disclosure.

FIG. 3 is a block diagram depicting some example components of a weather avoidance system 100, in accordance with some examples of this disclosure. Weather avoidance system 100 includes at least a weather radar system 104 and a vehicle navigation system 114. Onboard weather radar system 104 includes an antenna 152, processing circuitry (PC) 154, data communication 156, and a user interface 158.

Radar antenna 152 may be installed near the front of a vehicle, such as within the nose of aircraft 102, and includes transmission circuitry 160 configured to transmit a transmitted radar signal 106 (FIG. 1). For example, transmission circuitry 160 may use the photoelectric effect, passing an electric current through a metal or other substance, causing the metal or other substance to emit photons of a given wavelength.

Radar antenna 152 includes receiving circuitry 162 configured to receive a reflected radar signal 108 (FIG. 1). For example, receiving circuitry 162 may similarly use the photoelectric effect, such that it includes a metal or other substance that, when struck by photons of reflected radar signal 108, generate a characteristic electric current indicative of the reflected radar signal 108, which may then be interpreted as data by processing circuitry 154.

Processing circuitry (PC) 154 may be an example of processor(s) 132 (FIG. 2). PC 154 may receive a signal (e.g., data) indicative of reflected radar signal 108, and process the signal so as to determine one or more objects (e.g., obstructions or other obstacles) in the vicinity that would have caused the transmitted radar signal 106 to be reflected. For example, PC 154 may determine, based on reflected radar signal 108, the presence of an obstacle 110, such as a storm cell, in the flightpath of aircraft 102.

In some examples in accordance with this disclosure, PC 154 may further be configured to determine, based on an identified obstacle, a recommended flight maneuver in order to avoid the obstacle. For example, based on any number of factors including the position, speed and/or direction, size, shape, or nature of the obstacle, PC 154 may identify a specific recommended flight maneuver 112 (FIG. 1) in order to avoid the obstacle. For example, PC 154 may retrieve from memory 134 (FIG. 2) a number of potential flight maneuvers, and "test" each one to determine if the maneuver 112 would successfully avoid the obstacle indicated by reflected radar signal 108. In other examples, PC 154 may determine an area of space not currently occupied by or soon-to-be occupied by obstacle 110 and recommend a particular flight maneuver toward that unoccupied space. For example, PC 154 may determine a recommended flight maneuver 112 to climb at least one regulated flight level of altitude in order to vertically circumvent the obstacle 110, for example, to "jump over" a storm cell 110.

In some examples, weather radar system 104 includes a wired or wireless data communication connection 156 in order to communicate recommended flight maneuver 112 to onboard navigation system 114 for further analysis. Navigation system 166 may similarly include a wired or wireless data connection 166 configured to receive recommended flight maneuver 112 from weather radar system 104. Both or either of communication connections 156, 166 may be examples of communication channels 139 and/or datalink system 122 (FIG. 2).

In some examples, navigation system 114 includes a receiving (RX) antenna 162 configured to receive broadcast signals, such as passive surveillance broadcasts 118, from any nearby vehicles, such as other aircraft 116. For example, RX 162 may receive signals from nearby aircraft indicating at least a current position of the aircraft, such as determined by an onboard satellite navigation system. RX 162 may communicate the received signals 118 to processing circuitry (PC) 172.

PC 172 may be an example of processor(s) 132 (FIG. 2). PC 172 is configured to receive data including an indication of a recommended flight maneuver 112 and passive surveillance broadcasts 118, and determine, based on the received data, whether the recommended flight maneuver 112 is feasible. For example, PC 172 may compare the recommended flight maneuver 112 to the passive surveillance broadcasts 118 to determine whether the recommended flight maneuver would cause aircraft 102 to violate the separation distance from another aircraft (commonly referred to as the two aircraft being in "conflict" with each other).

In some examples, PC 172 may determine, based on the comparison, that recommended flight maneuver 112 does not interfere with the separation distance of any other aircraft 116. In other examples, RX 162 may not receive passive surveillance broadcasts 118 from other vehicles at all. In these examples, PC 172 may be configured to automatically generate a flightpath alteration request, in order to receive permission from a traffic controller, such as a ground-based air traffic controller 120, to perform the recommended flight maneuver 112. In examples in which recommended flight maneuver 112 includes a change in altitude of at least one flight level, flightpath alteration request may include an altitude change request, such as an In-Trail Procedures (ITP) request.

In some examples, PC 172 may be configured to display an indication of the flightpath alteration request on navigation system user interface (UI) 174, such that the request may be reviewed by a user, such as a pilot of aircraft 102, before it is transmitted to traffic controller 120.

UI 174 may be configured to output an indication of a potential collision with a nearby vehicle, based on passive surveillance broadcast signals 118 received from the other vehicle. UI 174 may include a display screen configured to output a graphical or textual indication, or a speaker configured to output an audio alert. UI 174 may also include a user input mechanism configured to receive an indication of the user's approval or disapproval of the recommended flight maneuver 112. For example, UI 174 may include a touchscreen, button, switch, or other manual input device.

In other examples, PC 172 may be configured to communicate the flightpath alteration request, via data communication connections 166, 156, to weather radar system 104. Radar system 104 may similarly be configured to display an indication of the flightpath alteration request on radar system user interface (UI) 158, such that the request may be reviewed by a user, such as a pilot of aircraft 102, before it is transmitted to traffic controller 120.

Radar system UI 158 may be configured to display a graphical indication of potential obstacles in the vicinity of aircraft 102. For example, UI 174 may include an output device 164, such as a display screen, configured to output a graphical indication of one or more obstacles detected by reflected radar signal 108. In some examples, user interfaces 158, 174 may be the same interface, and in some examples, either or both may be examples of communication interface 138 and/or display 124 (FIG. 2). Output device 164 may similarly be configured to output an indication of the flightpath alteration request, including the recommended flight maneuver 112.

UI 174 may also include a user input mechanism 166 configured to receive an indication of the user's approval or disapproval of the flightpath alteration request, including the recommended flight maneuver 112. For example, user input 166 may include a touchscreen, button, switch, or other manual input device through which a user may indicate approval or disapproval of the flightpath alteration request.

Upon receiving user input from UI 174 or UI 166, respective processing circuitry 172, 154 may determine that the user input indicates an approval of the flightpath alteration request. In response to determining user approval, weather avoidance system 100 may be configured to transmit the flightpath alteration request to traffic controller 120, such as via datalink service 140 (FIG. 2). In response, weather avoidance system 100 may receive granted permission from traffic controller 120, such as via datalink service 140. In response to receiving granted permission, weather avoidance system 100 may be configured to output an indication of the granted permission, such as via user interface(s) 158 and/or 174, to alert the pilot of the granted permission, so that the pilot of aircraft 102 may perform the recommended flight maneuver.

FIGS. 4A and 4B depict conceptual diagrams of an aircraft performing a weather-avoidance maneuver, in accordance with one example of the disclosure. Specifically, FIGS. 4A and 4B depict one particular use case for a weather-avoidance system 100, in accordance with techniques disclosed herein.

As shown in FIG. 4A, weather radar system 104 onboard vehicle 102 detects inclement weather, such as a storm cell 110, blocking the current flightpath 176 of vehicle 102. Weather radar system 104 may determine a recommended flight maneuver 112, including a vertical climb in altitude by two standard flight levels, up into a clear, open airspace 178, in order to avoid the storm cell 110. However, with typical systems, this recommended flight maneuver 112 encounters at least two problems. First, as shown in FIG. 4A, the recommended flight maneuver 112 would cause aircraft 102 to interfere with the standard horizontal separation distance behind nearby aircraft 116B, placing the two vehicles in "conflict" and at greater risk of a collision. Similarly, recommended flight maneuver 112 would cause aircraft 116A to interfere with the standard horizontal separation distance behind aircraft 102, placing the two vehicles in conflict with each other. Accordingly, this maneuver would not typically be permissible. Second, standard aeronautics regulations typically only permit an aircraft 102 to climb by a single standard flight level at a time. Accordingly, recommended flight maneuver 112 would not typically be available, feasible, or permissible.

However, as shown in FIG. 4B, the techniques of this disclosure may overcome the deficiencies of typical systems, allowing an otherwise-impermissible recommended flight maneuver 112 to become both feasible and allowable. Recent advances in technology surrounding passive surveillance broadcast signals have provided for more-accurate determinations of the positions of nearby aircraft 116A, 116B, based on those broadcast signals. One non-limiting example of such technology is known as In-Trail Procedures (ITP) systems. The increased accuracy in situational awareness of nearby aircraft using ITP systems has resulted in a number of changes to standard aeronautics operating procedures. First, due to the increased accuracy in position determinations, the permissible horizontal separation distance between aircraft implementing ITP applications has been decreased to only 15 nautical miles (NM). Second, a flightpath alteration including two vertical flight levels (e.g., an ascent or descent in altitude by two standard flight levels) may now be permissible, provided that the maneuver does not violate or otherwise interfere with the permissible horizontal or vertical separation distance from any other nearby aircraft.

Accordingly, as demonstrated in FIG. 4B, weather radar system 104 onboard vehicle 102 detects inclement weather, such as a storm cell 110, blocking the current flightpath 176 of vehicle 102. Weather radar system 104 may determine a recommended flight maneuver 112, including a vertical climb in altitude by two standard flight levels, up into a clear, open airspace 178, in order to avoid the storm cell 110. Weather radar system 104 communicates the recommended flight maneuver 112 to onboard navigation system 114, which determines, based on passive surveillance signals broadcast by nearby aircraft 116A, 116B, that the recommended flight maneuver 112 will not place any of the aircraft in conflict with one another, due in part on their reduced horizontal separation distances from having ITP systems installed as part of their onboard navigation systems 114. In response to determining that the maneuver 112 is feasible, navigation system 114 may automatically generate a flightpath alteration request, such as an ITP request, in order to receive permission from an air traffic controller to perform the recommended flight maneuver 112. Weather-avoidance system 100 may be configured to output an indication of the recommended maneuver and/or the alteration request for display to a user, such as the pilot of aircraft 102. In response to receiving user approval, system 100 may automatically transmit the flightpath alteration request to traffic controller 120. Upon receiving granted permission from traffic controller 120, system 100 may output an indication of the granted permission to the pilot, such that the pilot may proceed to perform the recommended flight maneuver 112.

FIGS. 5A and 5B depict an example user interfaces for a weather-avoidance system, in accordance with techniques of this disclosure. Specifically, FIG. 5A depicts a graphical user interface (GUI) 180A that may be displayed on display screen 124, which may be an example of user interfaces 158 and/or 174 (FIG. 3). GUI 180A includes a plurality of obstacles 110, such as storm clouds, as detected by weather radar system 104, as well as a graphical indication of a recommended flight maneuver 112 in order to avoid the obstacles 110.

As shown in FIG. 5A, GUI 180A includes an indication 182 of a flightpath alteration request, including details of a specified weather-avoidance maneuver 112, in order to avoid one or more of obstacles 110. Additionally, GUI 180A includes user input regions 166A, 166B, through which a user may approve or reject the flightpath alteration request, respectively. If a user toggles input button 166A, indicating an approval of the recommended maneuver, weather avoidance system 110 may automatically transmit the corresponding flightpath alteration request to a traffic controller. As shown in GUI 180B of FIG. 5B, once weather-avoidance system 100 receives an indication of granted permission from the traffic controller, system 100 may output an indication 184A, 184B of the granted permission to the pilot of the aircraft, such that the pilot may perform the recommended flight maneuver 112.

Figure 6:
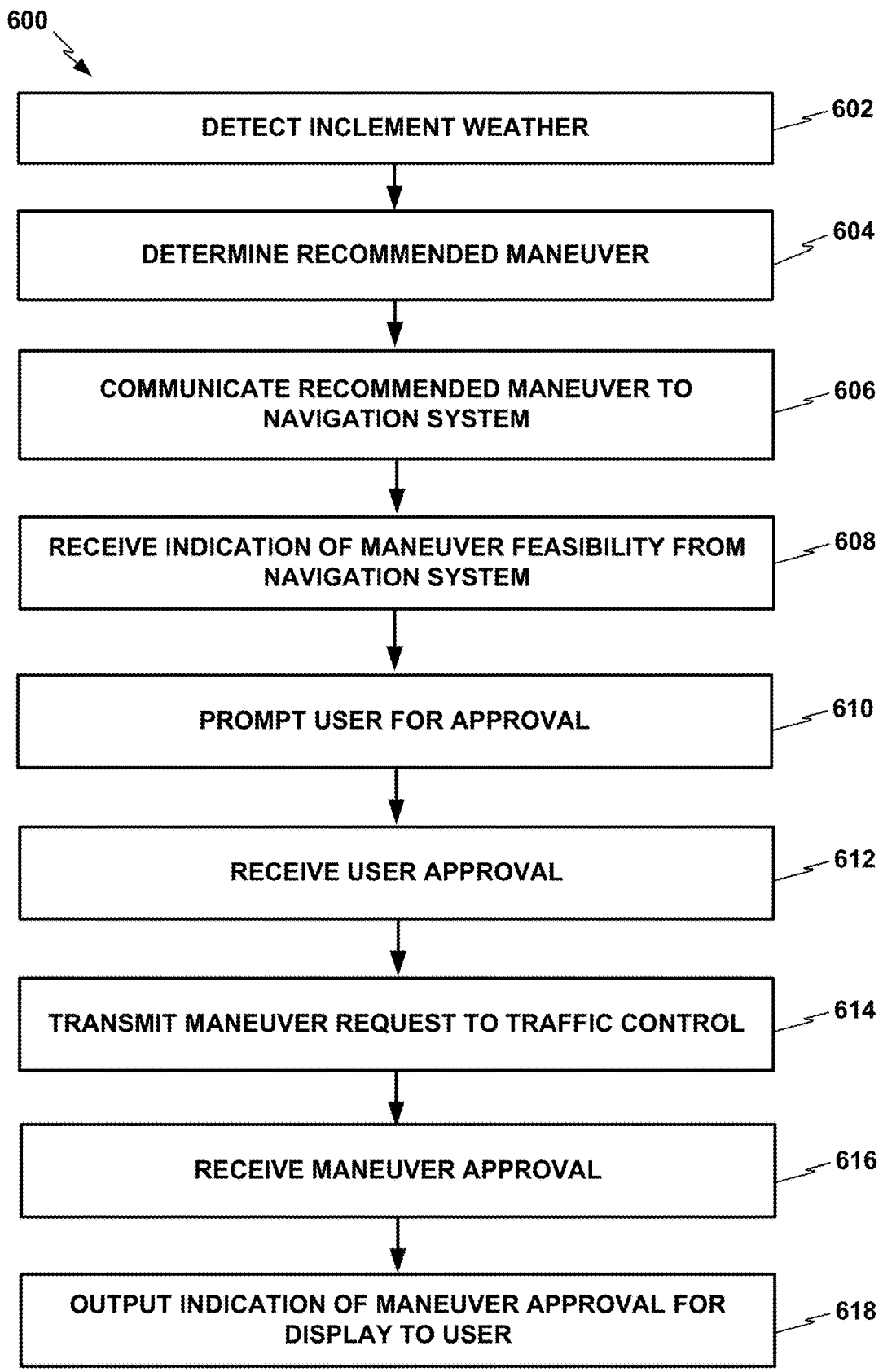
FIG. 6 is a flowchart depicting an example method for a vehicle to avoid inclement weather, in accordance with techniques of this disclosure.

FIG. 6 shows a flowchart for an example method 600 for avoiding inclement weather by a vehicle, as may be implemented, performed, executed, and/or embodied by a weather-avoidance system in various examples of this disclosure. Method 600 is described herein from the perspective of a weather radar system 104 (FIG. 2) within a broader weather-avoidance system 100.

Weather radar system 104 detects, based on a reflected radar signal, an occurrence of inclement or hazardous weather 110 interfering with the current flightpath (e.g., a future position) of the ownship 102 on which the radar system 104 is installed (602). Based on one or more aspects of the detected weather pattern, weather system 104 determines (e.g., identifies, generates, calculates, or selects) a recommended flight maneuver 112 that would successfully avoid or otherwise circumvent the hazardous region of the weather pattern 110 (604). In some examples, a recommended flight maneuver 112 may include a vertical climb in altitude by at least one flight level in order to fly over the hazard weather 110.

Weather radar system 104 communicates the recommended flight maneuver 112 to an onboard navigation system 114, such as a situational awareness system or a collision avoidance system (606). Navigation system 114 compares the recommended flight maneuver 112 to data indicative of the positions, velocities, and/or directions of travel of nearby aircraft, if any, to determine whether the recommended flight maneuver 112 would place ownship 102 "in conflict" with another vehicle, in that the vehicles would fall within each other's vertical and/or horizontal separation distances. If navigation system 114 determines that the recommended flight maneuver 112 is feasible (e.g., safe to conduct, with respect to any nearby vehicles), navigation system 114 may generate a flightpath alteration request, such as an ITP request, and communicate the request back to weather radar system 104, in some examples, along with an indication of the determined feasibility of the recommended flight maneuver 112.

Weather radar system 104 receives the indication of the determined feasibility of the recommended flight maneuver 112 and/or the flightpath alteration request, from navigation system 114 (608). In some examples, weather radar system 104 may output for display an indication of the recommended flight maneuver 112 and prompt a user, such as a pilot of ownship vehicle 102, to confirm or approve the recommended flight maneuver 112 and/or the corresponding flightpath alteration request (610). Upon receiving user input indicative of approval of the recommended flight maneuver 112 and/or the corresponding flightpath alteration request (612), weather radar system 104 may transmit the flightpath alteration request to a pertinent authority, such as an air traffic controller 120 (614). For example, the pilot may send a flightpath alteration request, such as a flight-altitude change request, to an air traffic controller via a connected radar system. Air traffic control (ATC) may then approve the flightpath alteration request (e.g., grant permission to conduct the recommended flight maneuver 112) and transmit the approval back to weather-avoidance system 100, which receives an indication of the granted permission (616), and outputs an indication of the granted permission to the pilot (618), so that the pilot may proceed to perform the recommended flight maneuver 112. For example, weather-avoidance system 100 may output a visual (e.g., graphical or textual) indication of the recommended maneuver and the granted permission on a display screen 124. In other examples, ATC may directly communicate the granted permission to the pilot, such as by communicating with the pilot via radio.

Techniques of this disclosure may be implemented in a device or article of manufacture comprising a computer-readable storage medium. The term "processor," as used herein may refer to any of the foregoing structure or any other structure suitable for processing program code and/or data or otherwise implementing the techniques described herein. Elements of weather-avoidance system 100 and/or processors 132 thereof, and/or system elements for executing and/or storing weather-avoidance system 100 or features thereof as disclosed above, may be implemented in any of a variety of types of solid state circuit elements, such as CPUs, CPU cores, GPUs, digital signal processors (DSPs), ASICs, a magnetic nonvolatile RAM or other types of memory, a mixed-signal integrated circuit, an FPGA, a microcontroller, a programmable logic controller (PLC), a programmable logic device (PLD), a complex programmable logic device (CPLD), a system on a chip (SoC), a subsection of any of the above, an interconnected or distributed combination of any of the above, or any other integrated or discrete logic circuitry, or any other type of component or one or more components capable of being configured in accordance with any of the examples disclosed herein. One or more memory devices 134 may include any volatile or non-volatile media, such as a RAM, ROM, non-volatile RAM (NVRAM), electrically erasable programmable ROM (EEPROM), flash memory, and the like. One or more memory devices 134 may store computer readable instructions that, when executed by one or more processors 132, cause the one or more processors 132 to implement the techniques attributed herein to weather-avoidance system 100.

The above examples are examples of tangible computer-readable storage media which are non-transitory. Aspect of this disclosure, however, may also be implemented in a communication medium such as a signal or carrier wave. Thus, computer readable media may be any available media that can be accessed by one or more computers or one or more processors to retrieve instructions, code and/or data structures for implementation of the techniques described in this disclosure. A computer program product may include a computer-readable medium.

Elements of weather-avoidance system 100 may be programmed with various forms of software. Weather-avoidance system 100 may be implemented at least in part as, or include, one or more executable applications, application modules, libraries, classes, methods, objects, routines, subroutines, firmware, and/or embedded code, for example. Elements of weather-avoidance system 100 as in any of the examples herein may be implemented as a device, a system, an apparatus, and may embody or implement a method of identifying inclement weather and determining a recommended maneuver, including for implementing example method 600 as described with reference to FIG. 6.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

Various illustrative aspects of the disclosure are described above. These and other aspects are within the scope of the following claims.

What is claimed is:

1. A method comprising:
   transmitting, by a weather radar system onboard a vehicle, radar signals;
   receiving, by the weather radar system, reflections of the radar signals;
   determining, by the weather radar system based on the reflections, an area of inclement weather in a travel path of the vehicle;
   determining, by the weather radar system, a recommended maneuver for the vehicle to avoid the area of inclement weather;
   communicating, by the processing circuitry to a navigation system onboard the vehicle, a first indication of the recommended maneuver for the vehicle;
   determining, by the navigation system, that the recommended maneuver for the vehicle will maintain minimum separation with other vehicles;
   presenting, by the navigation system, a second indication of the recommended maneuver to a user for approval;
   receiving, by the navigation system, user input after presenting the second indication to the user;
   determining, by the navigation system, that the user input indicates that the user approved the recommended maneuver;
   transmitting, by the navigation system, a third indication of the maneuver to a traffic controller in response to receiving the user input; and
   receiving, by the navigation system, a maneuver approval from the traffic controller in response to the third indication.

2. The method of claim 1, wherein determining the recommended maneuver includes determining a change in altitude of at least two flight levels.

3. The method of claim 1, wherein determining that the maneuver for the vehicle will maintain minimum separation with other vehicles comprises receiving automatic dependent surveillance broadcast (ADS-B) transmissions from the other vehicles.

4. The method of claim 3, wherein the vehicle is equipped with In-Trail Procedures (ITP), and wherein the minimum separation comprises an ITP separation distance.

5. The method of claim 1, wherein determining that the maneuver from the vehicle will maintain minimum separation with other vehicles comprises receiving no broadcast signals.

6. The method of claim 1, wherein the navigation system comprises a traffic collision avoidance system or a flight management system.

7. The method of claim 1, further comprising outputting for display an indication of the maneuver approval.

8. A system comprising:
   a memory; and
   one or more processors coupled to the memory, implemented in circuitry, and configured to:
      identify, based on a radar signal, an area of inclement weather in a travel path of a vehicle;
      determine a recommended maneuver for the vehicle to avoid the area of inclement weather;
      communicate, to a navigation system onboard the vehicle, a first indication of the recommended maneuver for the vehicle;
      determine that the recommended maneuver for the vehicle will maintain minimum separation with other vehicles;
      output a second indication of the recommended maneuver to a user for approval;
      receive user input after outputting the second indication to the user;
      determine that the user input indicates that the user approved the recommended maneuver;
      transmit a third indication of the maneuver to a traffic controller in response to receiving the user input; and
      receive a maneuver approval from the traffic controller in response to the third indication.

9. The system of claim 8, wherein determining the recommended maneuver includes determining a change in altitude of at least two flight levels.

10. The system of claim 8, wherein determining that the maneuver for the vehicle will maintain minimum separation with other vehicles comprises receiving automatic dependent surveillance broadcast (ADS-B) transmissions from the other vehicles.

11. The system of claim 10, wherein the vehicle is equipped with In-Trail Procedures (ITP), and wherein the minimum separation comprises an ITP separation distance.

12. The system of claim 8, wherein determining that the maneuver from the vehicle will maintain minimum separation with other vehicles comprises receiving no broadcast signals.

13. The system of claim 8, wherein the navigation system comprises a traffic collision avoidance system or a flight management system.

14. A non-transitory computer-readable storage medium operatively coupled to one or more processors and comprising executable instructions that cause the one or more processors to:
   identify, based on a radar signal, an area of inclement weather in a travel path of a vehicle;
   determine a recommended maneuver for the vehicle to avoid the area of inclement weather;
   communicate, to a navigation system onboard the vehicle, a first indication of the recommended maneuver for the vehicle;
   determine that the recommended maneuver for the vehicle will maintain minimum separation with other vehicles;
   present a second indication of the recommended maneuver to a user for approval;
   receive user input after presenting the second indication to the user;
   determine that the user input indicates that the user approved the recommended maneuver;
   transmit a third indication of the maneuver to a traffic controller in response to receiving the user input; and
   receive a maneuver approval from the traffic controller in response to the third indication.

* * * * *